J. LOPITSKY.
TRACK LAYER.
APPLICATION FILED MAR. 13, 1920.

1,396,765.

Patented Nov. 15, 1921.

INVENTOR
John Lopitsky
BY
George C. Heinicke
ATTORNEY

UNITED STATES PATENT OFFICE.

JOHN LOPITSKY, OF LIVINGSTON, WEST VIRGINIA.

TRACK-LAYER.

1,396,765. Specification of Letters Patent. Patented Nov. 15, 1921.

Application filed March 13, 1920. Serial No. 365,584.

*To all whom it may concern:*

Be it known that I, JOHN LOPITSKY, a citizen of Russia, residing at Livingston, county of Kanawha, and State of West Virginia, have invented certain new and useful Improvements in Track-Layers, of which the following is a specification.

This invention relates to railway track laying and repairing devices, and more particularly to a device for resetting rails which may have spread.

The invention has for an object to provide a simple and inexpensive device, whereby the rails of a track may be given a transverse movement with relation to one another to bring them to the proper gage spacing.

For further comprehension of the invention, and of the objects and advantages thereof, reference will be had to the following description and accompanying drawings, and to the appended claim in which the various novel features of the invention, are more particularly set forth.

Figure 1:
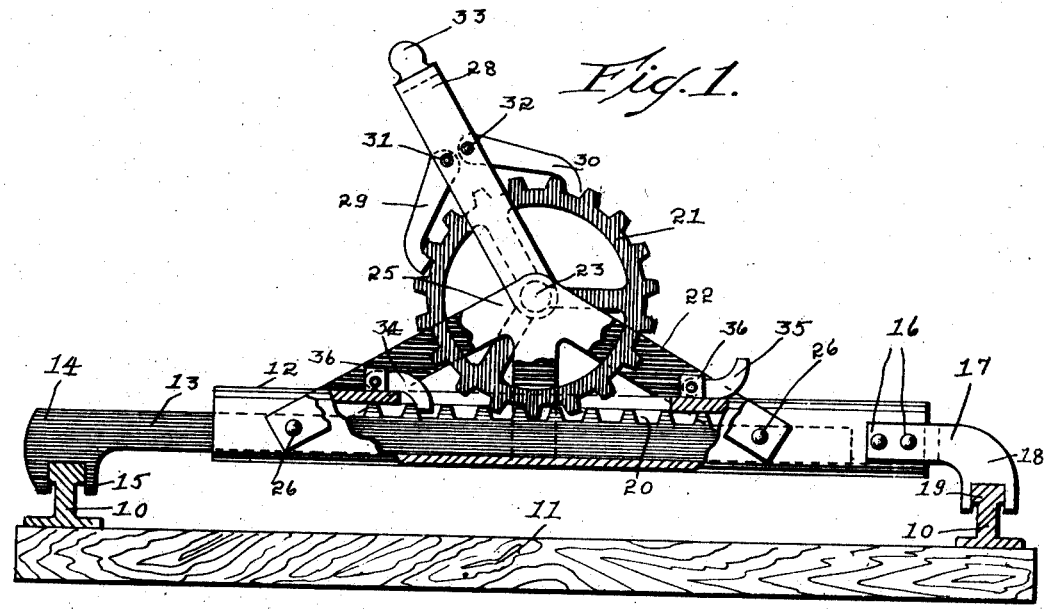

Figure 1 of the drawings is a side elevation, partly broken away to show interior construction, of a track setting device constructed according to my invention, showing it applied to a pair of track rails.

Figure 2:
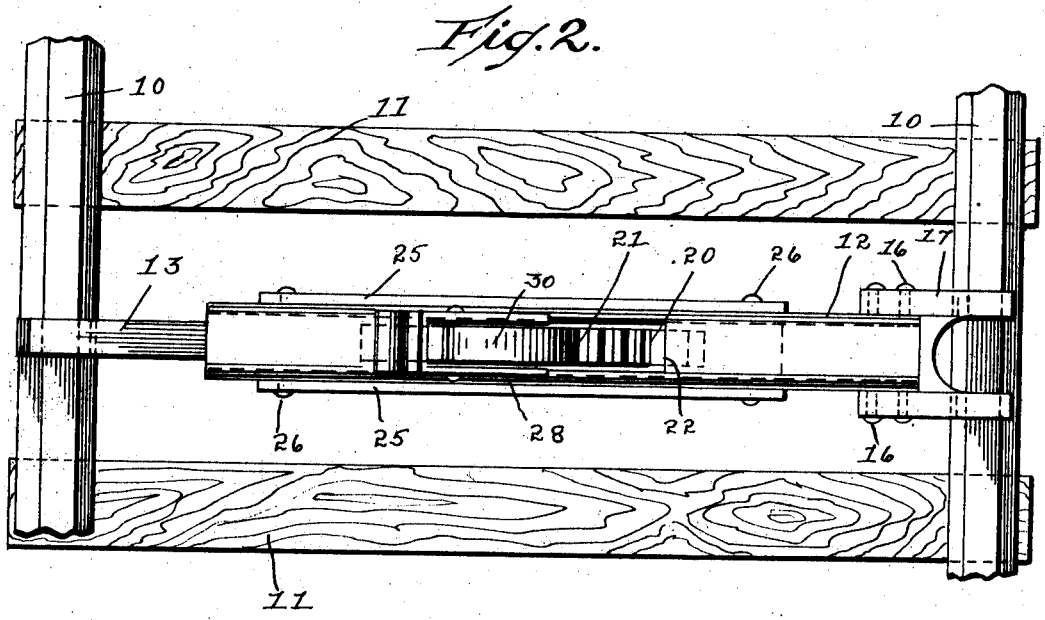

Fig. 2 is a plan view of the device.

In the drawings the rails of a track are shown at 10, being mounted on the usual ties or sleepers 11. My improved track setting device comprises a hollow bar 12 in which is slidably mounted a solid bar 13, these two bars jointly forming a telescoping bar.

The solid bar 13 extends at one end from the hollow bar 12 and has a downturned head 14 on its outer end which is transversely notched on its underside as at 15 to fit over one of the track rails. Upon the far end of the hollow bar is secured, as by the rivets 16, a forked bracket 17 which is downturned at its outer end as at 18, a transverse notch 19 similar to the notch 15 being formed on the under side of this downturned end 18 to receive the other one of the track rails.

Upon the upper face of the solid bar 13 are formed rack teeth 20 which are engaged by the teeth of a spur gear 21, the upper wall of the hollow bar 12 having an aperture 22 formed therein to accommodate this gear. This spur gear 21 is fixed on a stub-shaft 23 pivoted upon and between the upper ends of a pair of side brackets 25 riveted as at 26 to the sides of the hollow bar 12. It is obvious that the axis of the gear 21 is fixed with relation to the hollow bar 12, and that rotation of the gear will cause a relative movement of the two bars 12 and 13.

The gear 21 is adapted to be rotated by means of a U-shaped hand lever 28 loose upon the stub-shaft 23 and straddling the gear, this lever having a pair of oppositely extending pawls 29 and 30 pivoted to and between the legs thereof as at 31 and 32, the lever being provided with a knob or handle 33 on its outer end for purposes of operation, the pawls 29 and 30 being suitably shaped and arranged so as to engage and rotate the gear 21 in either direction.

Mounted upon the hollow bar 12 adjacent opposite ends of the aperture 22 therein, are a pair of pawls 34 and 35 which are adapted to be swung into engagement with the rack teeth 20 of the interior bar 13, and by their joint action to lock the two bars in their proper position, it being understood that these pawls 34 and 35 are so arranged with respect to the rack teeth as to register with the interstices of certain ones of the latter when the notches 15, and 19 in the members 14 and 18, are at the proper spacing to set the rails at their right gage. The pawls 34 and 35 may be suitably secured to brackets 36 on the bar 12 and may be swung to the position occupied by the pawl 35 in Fig. 1 where it rests on the top of the bar 12 when not in use.

It is believed that the operation of my improved track setting device will be apparent from the foregoing description. By swinging the lever 28 the gear 21 is rotated to move the solid bar 13 in the hollow bar 12 until the notches 15 and 19 can engage the rails which are to be set. The lever is then swung in the proper direction to bring the rails to their right spacing or gage, the required one of the pawls 34 and 35 being swung up away from the rack teeth 20 to permit of this movement. After the displaced rails have been properly set they may be secured in place by the usual spikes.

As will be apparent from the above description my improved rail setting device is simple and inexpensive in construction and may be used by unskilled workmen, effecting an economy in track work of the sort for which it is adapted.

Having thus described my invention what I claim as new and desire to secure by Let- ters Patent of the United States is as follows—

A track rail setting device comprising a horizontally disposed hollow bar, a second bar slidable therein, said bars having transversely notched end members adapted to grip over the track rails, rack teeth formed on said second bar, and a gear mounted on said hollow bar and projecting through an aperture with the said rack teeth, and a U-shaped operating lever straddling said gear and pivoted concentric thereto and having a pair of oppositely projecting pawls mounted thereon and adapted to engage the said gear whereby the lever may rotate the said gear in opposite directions, and a pair of locking pawls pivoted upon the said hollow bar adjacent opposite ends of the said aperture therein and adapted to engage the said rack teeth.

In testimony whereof I have affixed my signature.

JOHN LOPITSKY.